United States Patent
Gao

(10) Patent No.: US 11,600,300 B2
(45) Date of Patent: Mar. 7, 2023

(54) METHOD AND DEVICE FOR GENERATING DYNAMIC IMAGE

(71) Applicant: BEIJING DAJIA INTERNET INFORMATION TECHNOLOGY CO., LTD., Beijing (CN)

(72) Inventor: Ke Gao, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/132,044

(22) Filed: Dec. 23, 2020

(65) Prior Publication Data

US 2021/0335390 A1    Oct. 28, 2021

(30) Foreign Application Priority Data

Apr. 23, 2020   (CN) .......................... 202010329474.6

(51) Int. Cl.
  *G11B 27/031*  (2006.01)
  *G06V 10/75*   (2022.01)
  *G06V 20/40*   (2022.01)

(52) U.S. Cl.
  CPC .......... *G11B 27/031* (2013.01); *G06V 10/751* (2022.01); *G06V 20/46* (2022.01)

(58) Field of Classification Search
  CPC ............. G11B 27/031; G06K 9/00744; G06K 9/6202; G06T 13/00; G06T 11/60
  USPC ...................................................... 386/278
  See application file for complete search history.

(56) References Cited

U.S. PATENT DOCUMENTS

| | | | |
|---|---|---|---|
| 2003/0194131 A1* | 10/2003 | Zhao ...................... | G06V 10/40 382/165 |
| 2012/0017153 A1* | 1/2012 | Matsuda ............... | G11B 27/034 715/725 |
| 2016/0057446 A1* | 2/2016 | Tusch ....................... | G06T 3/40 375/240.08 |
| 2017/0061580 A1* | 3/2017 | Stan ...................... | G06T 3/4015 |
| 2017/0064345 A1* | 3/2017 | Cai ................... | H04N 21/23418 |
| 2017/0244984 A1* | 8/2017 | Aggarwal ............... | H04N 5/222 |
| 2018/0276899 A1* | 9/2018 | Liao .......................... | G06T 19/00 |
| 2019/0138851 A1* | 5/2019 | Gray ...................... | G06K 9/623 |
| 2019/0179960 A1* | 6/2019 | Im ........................... | G10L 17/00 |
| 2019/0198057 A1* | 6/2019 | Cheung ................ | G06K 9/6215 |
| 2022/0036042 A1* | 2/2022 | Takata ................. | G06V 30/224 |

FOREIGN PATENT DOCUMENTS

CN           109727301 A   *   5/2019

* cited by examiner

*Primary Examiner* — Loi H Tran
(74) *Attorney, Agent, or Firm* — Timothy W. Menasco, Esq.; Harter Secrest & Emery LLP

(57) ABSTRACT

Embodiments of the disclosure provide a method for generating a dynamic image, an electronic device for the same and a storage medium for the same. The electronic device obtains a video based on a trigger operation. The electronic device obtains images of the video by separating the images an audio data of the video. The images include first images and second images. The electronic device obtains target images by processing the first images. Each of the target images does not contain the target object. The electronic device generates the dynamic image based on the images and the target images.

9 Claims, 6 Drawing Sheets

METHOD AND DEVICE FOR GENERATING DYNAMIC IMAGE

CROSS REFERENCE TO RELATED APPLICATIONS

This application is based on and claims priority to Chinese Patent Application No. 202010329474.6, filed on Apr. 23, 2020, in the China National Intellectual Property Administration, the disclosure of which is herein incorporated by reference in their entireties.

FIELD

The disclosure relates to a field of image processing technologies, and more particularly to a method and a device for generating a dynamic image, an electronic device, and a storage medium.

BACKGROUND

With development of technology, mobile terminals, such as phones, have become indispensable products in peoples' daily life and work. With the phones, videos can be watched on a short video platform online. Further, a video of interest may be saved as a live wallpaper.

SUMMARY

Embodiments of the disclosure provide a method for generating a dynamic image. The method includes obtaining a video based on a trigger operation; obtaining images of the video by separating the images and audio data of the video, in which the images include first images and second images, each first image contains a target object, and each second image does not contain a target object; obtaining target images by processing the first images, in which each target image does not contain the target object; and generating the dynamic image based on the images and the target images.

Embodiments of the disclosure provide an electronic device. The electronic device includes one or more processors and one or more memories storing computer instructions that when executed by one or more processor to perform operations of a method for generating a dynamic image described above.

Embodiments of the disclosure provide a non-transitory computer readable storage medium, having instructions stored thereon. When the instructions are executed by a processor, the above-described method for generating a dynamic image is executed.

It should be understood that, the above general description and the following detailed description are only exemplary and explanatory, and do not limit the disclosure.

DETAILED DESCRIPTION

In order to enable the skilled person in the art to understand technical solutions of the disclosure better, the technical solution according to embodiments of the disclosure will be described clearly and completely with reference to the accompanying drawings.

It should be noted that terms "first" and "second" in the specification, appended claims and the above-mentioned drawings are used to distinguish similar objects, and not necessarily used to describe a specific sequence or sequence. It should be understood that features defined by these terms can be interchanged in appropriate circumstances so that embodiments of the disclosure described herein can be implemented in an order other than those illustrated or described herein. The implementation manners described in following embodiments do not represent all implementation manners consistent with the disclosure. Instead, they are only examples of devices and methods consistent with some aspects of the disclosure as detailed in the appended claims.

With development of technology, mobile terminals, such as phones, have become indispensable products in peoples' daily life and work. With the phones, videos can be watched on a short video platform online. Further, a video of interest may be saved as a live wallpaper. However, the video may be directly used as the live wallpaper in related arts.

The inventor has found that if the video is directly used as the live wallpaper, the live wallpaper will have sound and information that is not related to the video content, such as a QR code, which will affect the effect of the live wallpaper and reduce the user experience.

In order to solve a technical problem that a live wallpaper may have sound or information unrelated to content of a video, such as a quick response (QR) code, by directly using the video as the live wallpaper in related arts, which affects an effect of the live wallpaper and reduces the user experience. The disclosure provides a method and a device for generating a dynamic image, an electronic device and a storage medium.

Figure 1:
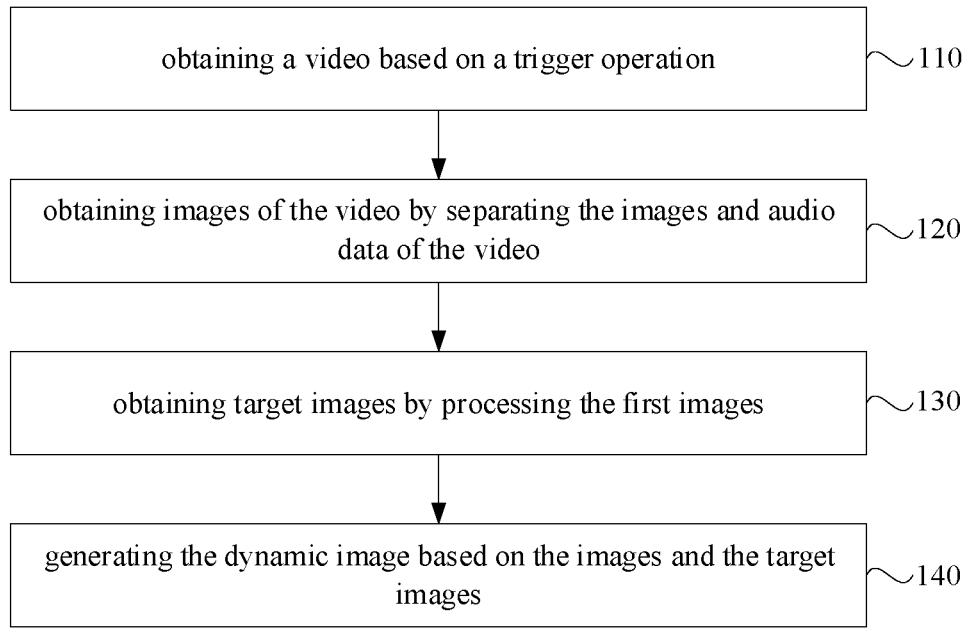
FIG. 1 is a flowchart illustrating a method for generating a dynamic image according to embodiments of the disclosure.

FIG. 1 is a flowchart illustrating a method for generating a dynamic image according to embodiments of the disclosure. As illustrated in FIG. 1, the method may include the following.

At block 110, a video is obtained based on a trigger operation.

At block 120, images of the video are obtained by separating the images and audio data of the video. The images include first images and second images, each first image contains a target object, and each second image does not contain a target object.

At block 130, target images are obtained by processing the first images. Each target image does not contain the target object.

At block 140, the dynamic image is obtained based on the images and the target images.

In detail, the method for generating a dynamic image according to embodiments of the disclosure will be described in detail below.

Figure 2:
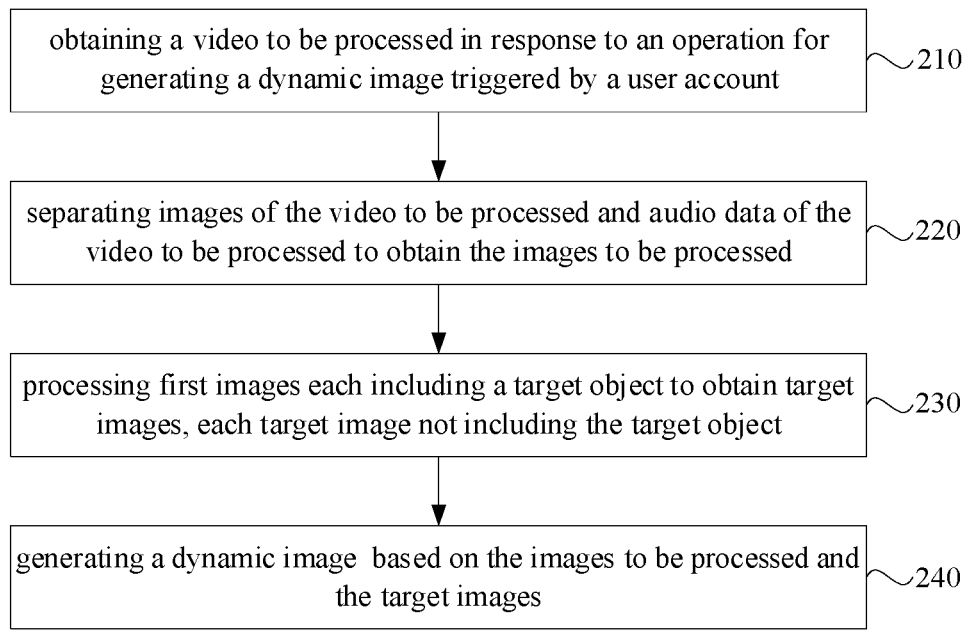
FIG. 2 is a flowchart illustrating a method for generating a dynamic image according to embodiments of the disclosure.

FIG. 2 is a flowchart illustrating a method for generating a dynamic image according to embodiments of the disclosure. The method may be applied to a terminal. The terminal may be a smart phone or a tablet computer. The terminal is not limited in embodiments of the disclosure.

As illustrated in FIG. 2, the method may include the following.

At block 210, in response to an operation for generating a dynamic image triggered by a user account, a video is obtained.

In detail, in practice, there are mainly two application scenarios where the user account triggers the operation for generating a dynamic image.

One application scenario includes the following. In response to that a user wants to generate a dynamic image from images contained in his/her favorite video while viewing his/her favorite video, that is, in response to that the user wants to generate a live wallpaper from images in his/her favorite video, the user can perform an operation on a button for generating a dynamic image displayed on a user interaction interface. For example, the user can click or double click the button for generating a dynamic image. The terminal may receive the operation for generating a dynamic image triggered by the user account and respond to the operation for generating a dynamic image triggered by the user account.

Another application scenario includes the following. In response to that the user wants to generate a dynamic image from images included in his/her favorite image set while viewing his/her favorite image set, that is in response to that the user wants to generate a live wallpaper from images included in his/her favorite image set, the user may perform an operation on a button for generating a dynamic image displayed on a user interaction interface. For example, the user can click or double click the button for generating a dynamic image. The terminal may receive the operation for generating a dynamic image triggered by the user account and respond to the operation for generating a dynamic image triggered by the user account.

The terminal may obtain the video after responding to the operation for generating a dynamic image triggered by the user account. There are two ways for the terminal to obtain the video.

For example, obtaining the video may include the following.

A request for obtaining the video is sent to a server to trigger the server to obtain the video. The obtained video is sent to the terminal.

In detail, in this way, in response to that the user wants to generate the dynamic image from the images contained in his/her favorite video while viewing this/her favorite video, the terminal may respond to the operation for generating a dynamic image triggered by the user account to send the request for obtaining the video to the server. After receiving the request for obtaining the video, the server may obtain the video from multiple videos and send the video to the terminal, such that the terminal obtains the video.

As another example, obtaining the video may include the following.

A request for obtaining the video is sent to the server to trigger the server to combine the images included in an image set into the video and send the video to the terminal.

In detail, in this way, in response to that the user wants to generate the dynamic image from the images included in his/her favorite image set while viewing his/her favorite image set, the terminal may respond to the operation for generating a dynamic image triggered by the user account to send the request for obtaining the video to the server. After receiving the request for obtaining the video, the server may combine the images included in the image set into the video and send the video to the terminal, such that the terminal obtains the video.

It can be seen from the above that when the user wants to generate the dynamic image from the images contained in his/her favorite video or from the images included in his/her favorite image set, the terminal can obtain the video from the server. The video is used for generating the user's favorite dynamic image by the terminal.

At block 220, images of the video and audio data of the video are separated to obtain the images.

In detail, the terminal may generate the dynamic image using the video. It may be understood that, the dynamic image generally does not require sounds. However, the video contains images and audio data. Therefore, in order to avoid the dynamic image generated subsequently from being affected by sounds, the images and the audio data of the video can be separated to obtain the images of the video.

It may be understood by the skilled person in the art that there may be multiple ways to separate the images and the audio data of the video. In embodiments of the disclosure, ways of separating the images and the audio data of the video are not limited in the disclosure.

At block 230, first images each including a target object are processed to obtain target images. Each target image does not include the target object.

In detail, the images usually include first images and second images. Each first image contains a target object unrelated to image content, and each second image does not contain the target object. A display content of the target object is not related to the image content. For example, an image frame may contain a QR code. In this case, the QR code is the target object and the image frame is the first image containing the target object. The target object that is unrelated to the image content can include a watermark or a signature.

In practice, in a case that an image including the target object, such as the QR code, is used to generate the wallpaper, a viewing effect of the live wallpaper may be reduced. Therefore, in the images, the first images each containing the target object are processed to obtain the target images each not containing the target object, such that the dynamic image generated subsequently does not include the target object.

For example, when a certain image frame of the images includes a QR code, by processing the certain image frame, the target image that does not include the QR code is obtained.

In some implementations, the target object may be an object that is contained in the image content but is not desired to be displayed in the generated dynamic image. For example, the target object may be an advertisement icon included in certain images, or objects and portraits that are not desired to be displayed in the subsequently generated dynamic image.

In some implementations, with the method according to embodiments of the disclosure, in the images, the first images each containing the target object may be processed to obtain the target images each not containing the target object. For example, the target object may be a certain person that appears repeatedly in some images. The image frame may be processed to obtain the target images that do not include the target object.

In some embodiments, an image feature (such as a size, a type and an object content of the target object) of the target object may be locally written and stored in advance. The image feature of the target object may be set in response to an external configuration request. Therefore, requirements of processing different target objects may be flexibly and dynamically met.

To clearly describe the technical solution, the implementation of the block 230 will be described in detail below.

At block 240, a dynamic image is generated based on the images and the target images.

In detail, after obtaining the target images that do not contain the target object, the dynamic image can be generated based on the images and the target images. Therefore, the generated dynamic image does not contain sounds or the target object whose display content is not related to the image content. The generated dynamic image has a good effect and user experience is improved.

In practice, based on the target images and all second images that do not contain the target object included in the images, the dynamic image can be generated. Further, based on the target images and some second images that do not contain the target object included in the images, the dynamic image can also be generated. Embodiments of the disclosure are not limited to the above.

In order to describe the technical solution clearly, implementations of the block 240 will be described in detail below.

With the technical solution according to embodiments of the disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sounds or the target object that the display content of the target object is not related to the image content. The effect of the generated dynamic image is improved and the user experience can be improved.

In practice, during processing the first images each containing the target object included in the images to obtain the target images each not including the target object, the first images each containing the target object are determined from the images. For example, an image is determined as the first image based on the image containing the target region. The image feature of the target region matches the image feature of the target object.

Therefore, in some implementations, the method for generating a dynamic image may further include the following, such as the blocks a1 and a2.

At block a1, it is determined whether an image contains a target region. An image content of the target region matches an image content of the target object.

The terminal can read each image frame of the images. Since the target object, such as the QR code, has a fixed image feature, an image recognition algorithm, such as OpenCV, can be used to perform such as denoising, smoothing, and transformation on the image frame, to strengthen important features of each image frame. That is, it is determined whether an image contains the target region whose image content matches the image feature of the target object, to locate the target region of the target object, such as the QR code.

In some implementations of embodiments of the disclosure, the image feature of the target object may include at least an object size and a content type of the target object. For example, the image feature of the target object may include only the object size, only the content type of the target object, or both the object size and the content type.

In this case, an image is detected based on image areas of the object size. The image containing a target region is determined based on an image area including content of the content type. Therefore, the block a1 of determining whether each image includes the target region may include the following, such as blocks a11 and a12.

At block a11, a region detection is performed on blocks of an image one by one based on the object size.

In detail, in performing the region detection on the blocks of the image, the blocks of the image may be detected one by one based on the object size of the target object. For example, the target object may be the QR code, and the object size of the target object may be the size of the QR code. Blocks of the image can be detected block by block based on the size of the QR code.

At block a12, in response to detecting that, for the image, the image content of an image area having the same size to the object size matches the content type of the target object, it is determined that the image includes the target region.

In detail, during detecting the blocks of the image, in response to detecting that the image content of the image area having the same size to the object size matches the content type of the target object, that is, in response to detecting that the image content of the image area in the image frame matches the object content of the target object and the image area has the object size of the target object, it may be determined that the image includes the target region. The target region is a region of the image having the image content conforming with the content type of the target object. The size of the target region is the same as the object size of the target object.

With the technical solution according to implementations of the disclosure, based on the object size of the target object, blocks of each image are detected one by one. In response to determining that for an image, the image content of the image area having the same size of the object size matches the content type of the target object, it is determined that the image frame includes the target region. Therefore, it may be further accurately determined whether the image include the target region, and it may be further accurately determined the image include the target region.

At block a2, the image containing the target region is determined as the first image including the target object.

In detail, in response to determining that an image includes the target region whose display content matches the image feature of the target object, it may be determined that the image includes the target object. Therefore, the image can be determined as the first image containing the target object. The first image containing the target object may be processed subsequently.

It may be understood that, in practice, the execution sequence of blocks a1 and a2 can be before the block 230.

With the technical solution according to embodiments, by detecting whether the target region is contained in each image, the first image containing the target object may be determined from the images. The first image containing the target object may be processed by the terminal subsequently, such that the dynamic image generated subsequently does not include the target object, which is beneficial to improve the effect of the dynamic image.

For clearly describe the technical solution, implementations of the block 230 may be described in detail below.

Figure 3:
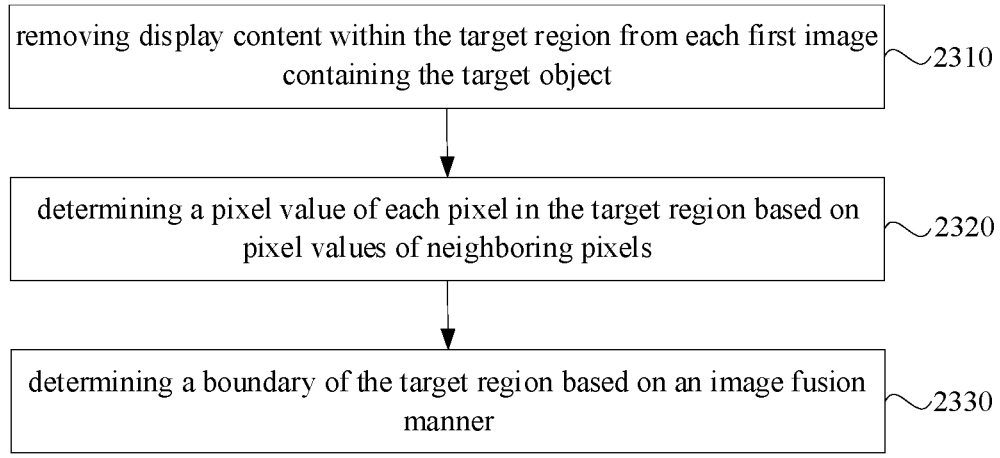
FIG. 3 is a flowchart illustrating an implementation of a block 230 in FIG. 1 according to embodiments of the disclosure.

In some implementations, the block 230 of obtaining the target images each not containing the target object by processing the first images each containing the target object included in the images may include the following, as illustrated in FIG. 3.

At block 2310, display content within the target region is removed from each first image containing the target object.

In detail, the target region of the first image containing the target object is a region where the target object is located. In order to remove the target object from the first image containing the target object, the display content within the target region may be removed from the first image containing the target object. For example, the target object is a QR code, and the QR code displayed within the target region can be removed.

At block 2320, a pixel value of each pixel in the target region is determined based on pixel values of neighboring pixels.

In detail, after the display content of the target region is removed from the first image containing the target object, in order to obtain the whole image content of the first image containing the target object, the target region is filled with image content after the image content of the target region is removed. A rule for generating the target object, such as the QR code, is fixed. The target region where the target object, such as the QR code, is located is generally in the background region of the first image containing the target object, rather than in the foreground region of the first image containing the target object. The image content of the background region is generally monotonous. Therefore, for filling the target region after the display content is removed, the pixel value of a pixel in the target region whose display content is removed can be determined based on pixel values of the neighboring pixels of the pixel. That is, for the pixel of the target region whose display content is removed, the pixel value can be determined by determining a weighted average of the pixel values of the neighboring pixels.

Figure 4:
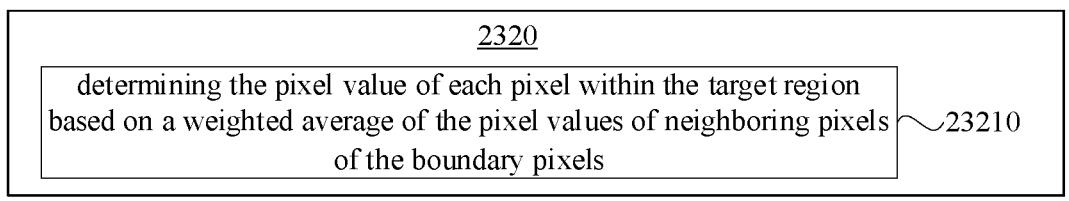
FIG. 4 is a flowchart illustrating an implementation of a block 2320 in FIG. 2 according to embodiments of disclosure.

In some embodiments of the disclosure, the block 2320 of determining the pixel value of the pixel within the target region based on the pixel values of the neighboring pixels may include determining the pixel value of each pixel within the target region based on a weighted average of pixel values of neighboring pixels. In detail, as illustrated in FIG. 4, the block 2320 further includes the followings.

At block 23210, the pixel value of each pixel within the target region is determined based on a weighted average of the pixel values of neighboring pixels.

In detail, for a boundary pixel of the target region whose display content is removed, the pixel values of the neighboring pixels of the boundary pixel are determined. Therefore, the weighted average of the pixel values of the neighboring pixels of the boundary pixel can be determined as the pixel value of the boundary pixel. It can be understood that, multiple neighboring pixels may be around the boundary pixel. Weighted coefficients may be determined for the pixel values of multiple neighboring pixels based on an actual condition, which is not limited in embodiments of the disclosure.

In some embodiments, based on a sequence from boundary pixels to a central pixel of the target region, for the pixel within the target region except the boundary pixel, the weighted average of pixel values of neighboring pixels is determined as the pixel value of the pixel.

In detail, after determining the boundary pixels of the target region whose display content is removed, for a pixel near the boundary pixels within the target region whose display content is removed, the pixel value of the pixel may be determined based on the pixel values of the neighboring pixels. Therefore, the pixel value of the pixel may be determined by determining the weighted average of the pixel values of the neighboring pixels of the pixel. Based on an order from the boundary pixels to the center pixel of the target region whose display content is removed, the weighted value of the pixel values of the neighboring pixels of the pixel in the target region whose display content is removed except the boundary pixels are sequentially determined as the pixel value of the pixel. That is, the target region whose display content is removed is filled in a manner of gradually determining the pixel value from the boundary to the center.

With the technical solution according to embodiments, with the method of gradually determining the pixel value from the border to the center, the target region whose display content is removed may be filled smoothly, such that target region may be natural and beautiful, thereby improving the effect of the generated dynamic image.

At block 2330, a boundary of the target region whose display content is removed is determined based on an image fusion manner.

In detail, after the target region whose display content is removed is filled, in order to make the target region whose display content is removed smooth and natural, the image fusion method, such as Poisson fusion, can be used to determine the boundary of the target region whose display content is removed. The manner of the image fusion is not limited in embodiments of the disclosure.

With the technical solution according to embodiments, the display content of the target region where the target object is located in the first image including the target object can be removed, the target region where the target object is located is filled, and the boundary of the target region is obtained. Therefore, the generated target image not including the target object may be smooth, beautiful, and natural, thereby improving the effect of the generated dynamic image.

In order to describe the technical solution clearly, the implementation of the block 240 will be described in detail in the following.

Figure 5:
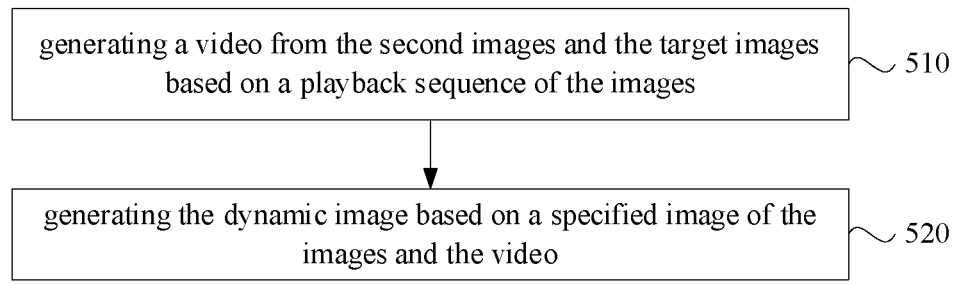
FIG. 5 is a flowchart illustrating an implementation of a block 240 in FIG. 1 according to embodiments of the disclosure.

In implementations, the block 240 of generating the dynamic image based on the images and the target image may include the following, as illustrated in FIG. 5.

At block 510, a video is generated from the target images and the second images based on a playback sequence of the images.

In detail, after processing the first images that are included in the images and include the target object to obtain the target images that do not include the target object, the target images can be rewritten into the images based on the playback sequence of the images. That is, the video may be generated based on the target images and the second images that are included in the images and do not include the target object. In order to describe the technical solution clearly, the generated video is referred to as the first video.

At block 520, the dynamic image is generated based on a specified image of the images and the video.

In detail, the specified image may be an image frame having a preset order of the images. A static image and a video file are required to generate the dynamic image. The image frame having the preset order in the images may be used as the static image. The image frame having the preset order may be a first frame of the images or another frame of the images. The image frame having the preset order is not limited in embodiments of the disclose. In practice, in order to ensure the playback continuity of the dynamic image, the first frame of the images can be used as the static image.

After using the image frame having the preset order in the images as the static image, the image frame having the preset order and the video may be used to generate the dynamic image.

With the technical solution according to embodiments of the disclosure, the generated dynamic image does not include sound or the target object whose display content is unrelated to the image content. Therefore, the effect of the generated dynamic image is good and user experience may be improved.

Figure 6:
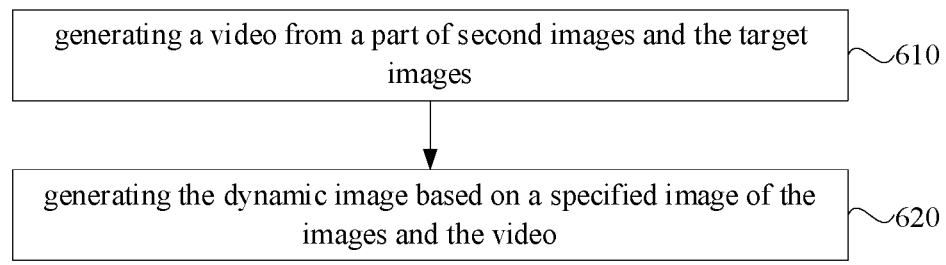
FIG. 6 is a flowchart illustrating an implementation of a block 240 in FIG. 1 according to embodiments of the disclosure.

In embodiments, the block 240 of generating the dynamic image based on the images and the target images may include the following, as illustrated in FIG. 6.

At block 610, a video is generated from a part of second images and the target images.

In detail, in some embodiments, the part of the second images that do not include the target object and the target images may be used to generate the dynamic image. The part of the second images may be a preset number of second images. Therefore, the preset number of second images that do not include the target object may be selected from the images. The preset number may be determined based on an actual condition. Which of the images selected as the preset number of second images that do not include the target object may be determined based on an actual condition, which is not limited in embodiments of the disclosure.

After the preset number of second images that do not include the target object are selected from the images, the preset number of second images and the target images may be used to generate a video. In order to clearly describe the technical solution, the video may be referred to as the second video. In addition, in generating the second video, the second video can be generated based on a playback sequence of the preset number of second images and the target images or based on an arbitrary sequence of the preset number of second images and the target images, which is not limited in embodiments of the disclosure.

At block 620, the dynamic image is generated based on a specified image of the images and the video.

In detail, the specified image may be an image having a preset order of the images. Generating the dynamic image requires a static image and a video file. The image frame having the preset order included in the images may be used as the static image. The image frame having the preset order may be a first frame of the images, or another frame of the images, which is not limited in embodiments of the disclosure.

After using the image frame having the preset order included in the images as the static image, the image frame having the preset order and the second video may be used to generate the dynamic image.

With the technical solution according to embodiments of the disclosure, the generated dynamic image does not include sound or the target object whose display content is not related to the image content. Therefore, the effect of the generated dynamic image is good and the user experience is improved.

In order to allow the user to intuitively watch a progress of generating the dynamic image, in embodiments, the method for generating a dynamic image may further include the following, such as blocks b1 and b2.

At block b1, a current percentage of a progress of generating the dynamic image is displayed on the user interaction interface.

In detail, the entire process of generating the dynamic image is time-consuming. Therefore, in order to allow the user to intuitively watch the progress of generating the dynamic image, the current percentage of the progress of generating the dynamic image may be displayed on the user interaction interface. It may be understood that the percentage of the process can be 0% to 100%.

At block b2, in response to determining that the current percentage of the process of generating the dynamic image is 100%, displaying of the percentage of the process is stopped.

In response to determining that the current percentage of the process of generating the dynamic image is 100%, generating the dynamic image is ended. Therefore, the percentage of the can be stopped to display. By displaying the percentage of the process on the user interaction interface UI, the user can intuitively view the progress of generating the dynamic image in real time, thereby improving the user experience.

In order to describe the technical solution clearly, the dynamic image being used as the live wallpaper, the method for generating the live wallpaper will be described in detail below in combination with followings. The target object may be a QR code.

Figure 7:
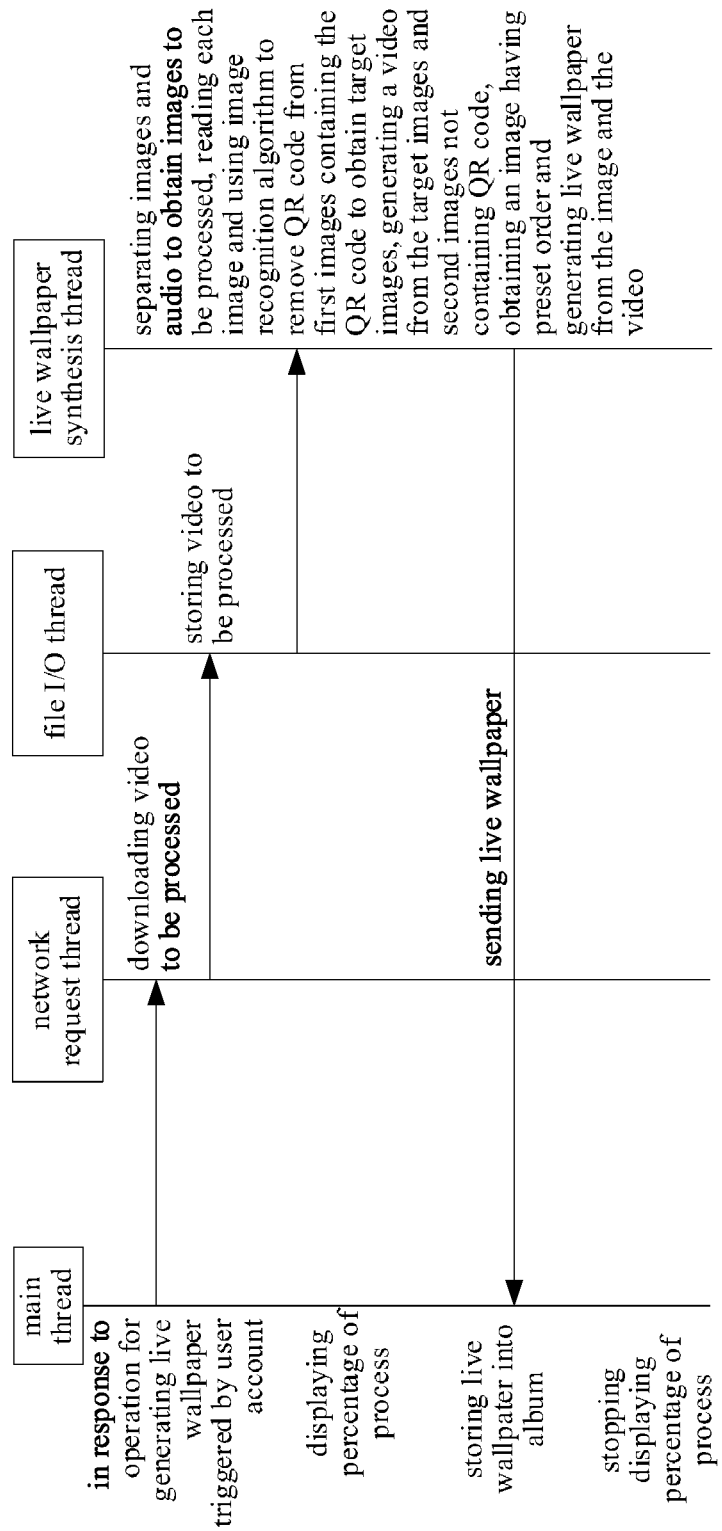
FIG. 7 is a schematic diagram illustrating interaction among a main thread, a network request thread, a file I/O thread, and a live wallpaper synthesis thread in a process of generating a live wallpaper according to embodiments of the disclosure.

As illustrated in FIG. 7, the terminal can generate the live wallpaper through a main thread, a network request thread, a file I/O thread, and a live wallpaper synthesis thread.

Interactions among the main thread, the network request thread, the file I/O thread, and the live wallpaper synthesis thread may include the following.

The main thread responds to an operation for generating a live wallpaper triggered by the user account.

After the main threshold responds to the operation for generating a live wallpaper by the user account, the network request thread downloads the video.

After the network request thread downloads the video, the file I/O thread saves the video.

After the file I/O thread saves the video, the live wallpaper synthesis thread separates the images and the audio data of the video to obtain the images, reads each image, and uses the image recognition algorithm to remove the QR code from images including the QR code to obtain the target images that do not include the QR code. A video is generated from the target images and the images that do not include the QR code. An image frame having a preset order is selected from the images, and the live wallpaper is generated from image frame having the preset order and the video.

The live wallpaper synthesis thread sends the generated live wallpaper to the main thread, and the main thread saves the live wallpaper to an album.

In a process of synthesizing the live wallpaper, a percentage of the progress is displayed on the user interaction interface of the main thread. After the main thread saves the live wallpaper to the album, the percentage of the progress displayed on the user interaction interface is stopped.

It should be noted that descriptions of embodiments can be seen from the foregoing embodiments, which are not repeated herein.

Figure 8:
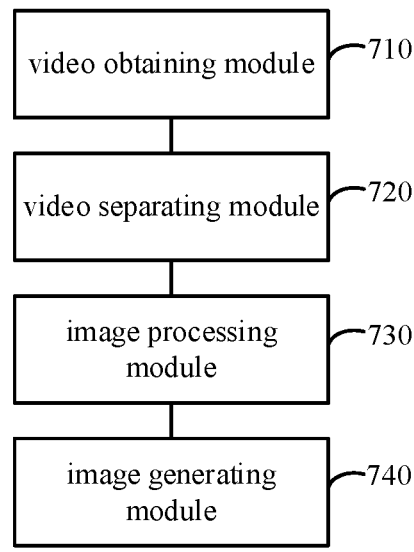
FIG. 8 is a block diagram illustrating a device for generating a dynamic image according to embodiments of the disclosure.

Embodiments of the present disclosure further provide a device for generating a dynamic image. As illustrated in FIG. 8, the device includes a video obtaining module 710, a video separating module 720, an image processing module 730 and an image generating module 740.

The video obtaining module 710 is configured to obtain a video in response to an operation for generating a dynamic image triggered by a user account.

The video separating module 720 is configured to separate images of the video and audio data of the video to obtain the images. The images include first images and second images. Each first image contains a target object and each second image does not contain a target object.

The image processing module 730 is configured to process first images each including a target object to obtain target images. Each target image does not include the target object.

The image generating module 740 is configured to generate a dynamic image based on the images and the target images.

With the technical solution according to embodiments of the present disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sounds or the target object whose display content of the target object is not related to the image content. The effect of the generated dynamic image is good and the user experience can be improved.

In some embodiments, an image is determined as the first image based on the image containing a target region. The image feature of the target region matches the image feature of the target object.

In detail, the device further includes a region detecting module and an image determining module.

The region detecting module is configured to determine whether an image includes the target region. An image feature of the target object within the target region matches an image content of the target object.

The image determining module is configured to determine the image containing the target region as the first image including the target object.

In some embodiments, the image feature of the target object at least includes an object size and a content type of the target object. An image is detected based on image areas of the object size. The image containing a target region is determined based on an image area including content of the content type.

In detail, the region detecting module is configured to perform a region detection on blocks of an image one by one based on the object size; and in response to detecting, for the image, that the image content of an image area having the same size to the object size matches the content type of the target object, determine that the image includes the target region.

In some embodiments, the image processing module includes a display content removing unit, a pixel value determining module and a boundary region processing module.

The display content removing unit is configured to, remove display content within the target region where the target object is located from the first image containing the target object.

The pixel value determining module is configured to determine a pixel value of each pixel in the target region based on pixel values of neighboring pixels.

The boundary region processing module is configured to determine a boundary of the target region whose display content is removed based on an image fusion manner.

In some embodiments, the pixel value determining module is configured to, for a boundary pixel of the target region, determine a weighted average of the pixel values of neighboring pixels; and based on a sequence from boundary pixels to a central pixel of the target region, for the pixel within the target region except the boundary pixel, determine the weighted average of pixel values of neighboring pixels as the pixel value of the pixel.

In some embodiments, the image generating module is configured to generate a video from the target images and the second images based on a playback sequence of the images; and generate the dynamic image from a specified image of the images and the video.

In some embodiments, the image generating module is configured to generate a video from a part of second images and the target images, and generate the dynamic image based on a specified image of the images and the video.

Figure 9:
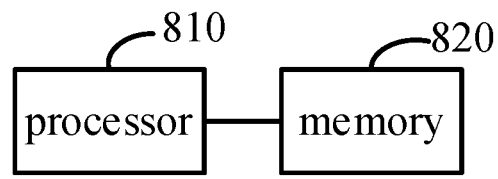
FIG. 9 is a block diagram illustrating an electronic device according to embodiments of the disclosure.

Embodiments of the disclosure further provide an electronic device. As illustrated in FIG. 9, the electronic device includes one or more processors 810 and one or more memories 820 storing computer instructions executable by the processor 810.

When the computer instructions are executed by the one or more processor 810, the computer instructions are caused to perform operations including: obtaining a video based on a trigger operation; obtaining images of the video by separating the images and audio data of the video, in which the images include first images and second images, each first image contains a target object, and each second image does not contain a target object; obtaining target images by processing the first images, in which each target image does not contain the target object; and generating the dynamic image based on the images and the target images.

In some embodiments, the operations further include determining an image as a first image based on the image containing a target region. An image feature of the target region matches an image feature of the target object.

In some embodiments, the image containing a target region includes detecting the image based on image areas of an object size, in which the object size is included in the image feature of the target object; and determining the image containing a target region based on an image area including content of a content type, in which the content type is included in the image feature of the target object.

In some embodiments, processing the first image includes removing image content within a target region from the first image, in which the target object is located within the target region; determining a pixel value of each pixel within the target region based on pixel values of neighboring pixels; and determining a boundary of the target region based on an image fusion manner.

In some embodiments determining a pixel value of each pixel within the target region includes determining the pixel value of each pixel within the target region based on a weighted average of pixel values of neighboring pixels.

In some embodiments, generating the dynamic image includes generating a video from the second images and the target images based on a playback sequence of the images; and generating the dynamic image based on a specified image of the images and the video.

In some embodiments, generating the dynamic image includes generating a video from a part of the second images and the target images; and generating the dynamic image based on a specified image of the images and the video.

With the technical solution according to embodiments of the disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sound or the target object that the display content of the target object is not related to the image content. The effect of the generated dynamic image is good and the user experience can be improved.

Figure 10:
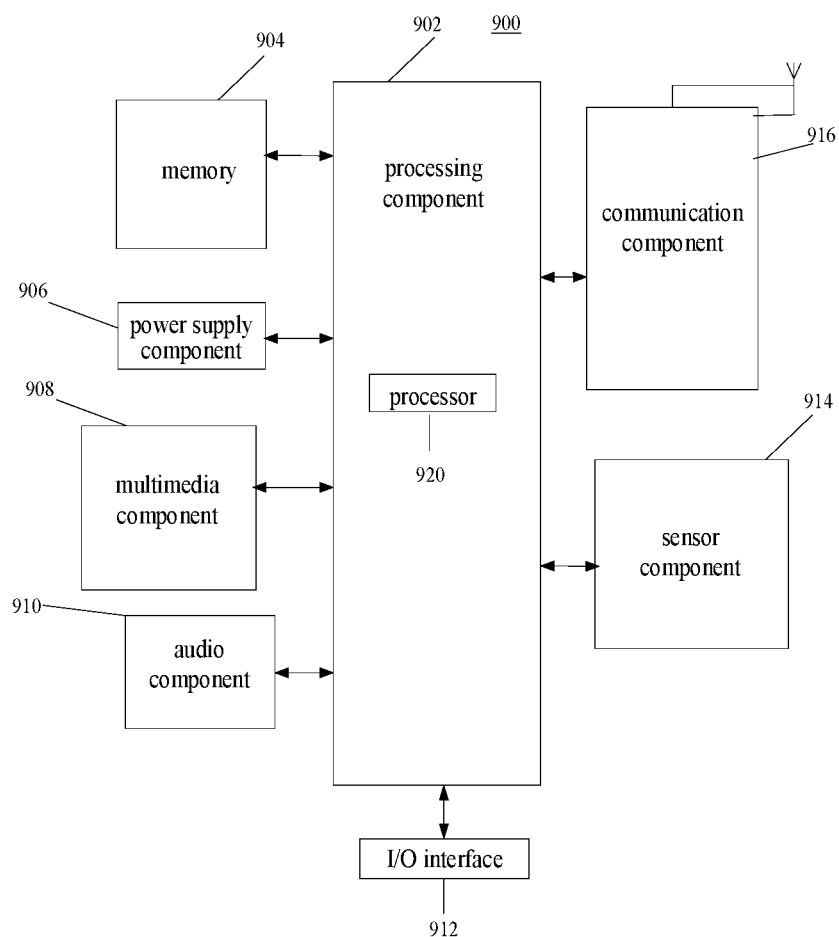
FIG. 10 is a block diagram illustrating a device for generating a dynamic image according to embodiments of the disclosure.

FIG. 10 is a block diagram illustrating a device 900 for generating a dynamic image according to embodiments of the disclosure. The device 900 may be a mobile phone, a computer, a digital broadcast terminal, a messaging device, a game console, a tablet device, medical equipment, fitness equipment, a personal digital assistant, and so on.

As illustrated in FIG. 10, the device 900 may include one or more of: a processing component 902, a memory 904, a power component 906, a multimedia component 908, an audio component 940, an input/output (I/O) interface 912, a sensor component 914, and a communication component 916.

The processing component 902 normally controls the overall operation (such as operations associated with displaying, telephone calls, data communications, camera operations and recording operations) of the device 900. The processing component 902 may include one or more processors 920 to execute instructions so as to perform all or part of the blocks of the above-described method. In addition, the processing component 902 may include one or more units to facilitate interactions between the processing component 902 and other components. For example, the processing component 902 may include a multimedia unit to facilitate interactions between the multimedia component 908 and the processing component 902.

The memory 904 is configured to store various types of data to support operations at the device 900. Examples of such data include instructions of any application or method operated on the device 900, contact data, phone book data, messages, images, videos and the like. The memory 904 may be realized by any type of volatile or non-volatile storage devices, or a combination thereof, such as a static random-access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 906 provides power to various components of the device 900. The power component 906 may include a power management system, one or more power sources and other components associated with power generation, management, and distribution of the device 900.

The multimedia component 908 includes a screen that provides an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may sense not only boundaries of the touch or sliding operation, but also the duration and pressure related to the touch or sliding operation. In some embodiments, the multimedia component 908 includes a front camera and/or a rear camera. When the device 900 is in an operation mode such as a shooting mode or a video mode, the front camera and/or the rear camera may receive external multimedia data. Each of the front camera and the rear camera may be a fixed optical lens system or have a focal length and an optical zoom capability.

The audio component 910 is configured to output and/or input an audio signal. For example, the audio component 910 includes a microphone (MIC) that is configured to receive an external audio signal when the device 900 is in an operation mode such as a call mode, a recording mode, and a voice recognition mode. The received audio signal may be further stored in the memory 904 or transmitted via the communication component 916. In some embodiments, the audio component 910 further includes a speaker for outputting the audio signal.

The I/O interface 912 provides an interface between the processing component 902 and a peripheral interface unit. The peripheral interface unit may be a keyboard, a click wheel, a button and so on. These buttons may include, but are not limited to, a home button, a volume button, a start button, and a locking button.

The sensor assembly 914 includes one or more sensors for providing the device 900 with various aspects of status assessments. For example, the sensor component 914 may detect an ON/OFF state of the device 900 and a relative positioning of the components. For example, the components may be a display and a keypad of the device 900. The sensor component 914 may also detect a change in position of the device 900 or a component of the device 900, the presence or absence of contact of the user with the device 900, the orientation or acceleration/deceleration of the device 900 and a temperature change of the device 900. The sensor component 914 may include a proximity sensor configured to detect the presence of nearby objects without any physical contact. The sensor component 914 may also include an optical sensor (such as a CMOS or a CCD image sensor) for use in imaging applications. In some embodiments, the sensor component 914 may further include an acceleration sensor, a gyro sensor, a magnetic sensor, a pressure sensor, or a temperature sensor.

The communication component 916 is configured to facilitate wired or wireless communication between the device 900 and other devices. The device 900 may access a wireless network based on a communication standard such as Wi-Fi, an operator network (such as 2G, 3G, 4G or 5G), or a combination thereof. In an example embodiment, the communication component 916 receives broadcast signals or broadcast-associated information from an external broadcast management system via a broadcast channel. In an example embodiment, the communication component 616 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In an example embodiment, the device 900 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above method.

In an example embodiment, there is also provided a storage medium including instructions, such as a memory 904 including instructions. The instructions are executable by the processor 920 of the device 900 to perform the above method. For example, the storage medium is non-transitory computer readable storage medium. In an example, the non-transitory computer readable storage medium may be a ROM, a random-access memory (RAM), a CD-ROM, a magnetic tape, a floppy disk, an optical data storage device, and so on.

With the technical solution according to embodiments of the disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sound or the target object that the display content of the target object is not related to the image content. The effect of the generated dynamic image is good and the user experience can be improved.

Embodiments of the disclosure provide a non-transitory computer readable storage medium, having instructions executable by a processor stored thereon. When the instructions stored in the storage medium is executed by a processor of an electronic device, the electronic device may be configured to execute a method for generating a dynamic image.

In some embodiments, the method includes obtaining a video based on a trigger operation; obtaining images of the video by separating the images and audio data of the video, in which the images include first images and second images, each first image contains a target object, and each second image does not contain a target object; obtaining target images by processing the first images, in which each target image does not contain the target object; and generating the dynamic image based on the images and the target images.

In some embodiments, the method further includes determining an image as a first image based on the image containing a target region, in which an image feature of the target region matches an image feature of the target object.

In some embodiments, the image containing a target region includes detecting the image based on image areas of an object size, in which the object size is included in the image feature of the target object; and determining the image containing a target region based on an image area including content of a content type, in which the content type is included in the image feature of the target object.

In some embodiments, processing the first image includes removing image content within a target region from the first image, in which the target object is located within the target region; determining a pixel value of each pixel within the target region based on pixel values of neighboring pixels; and determining a boundary of the target region based on an image fusion manner.

In some embodiments, determining a pixel value of each pixel within the target region includes determining the pixel value of each pixel within the target region based on a weighted average of pixel values of neighboring pixels.

In some embodiments, generating the dynamic image includes generating a video from the second images and the target images based on a playback sequence of the images; and generating the dynamic image based on a specified image of the images and the video.

In some embodiments, generating the dynamic image includes generating a video from a part of the second images and the target images; and generating the dynamic image based on a specified image of the images and the video.

With the technical solution according to embodiments of the disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sound or the target object that the display content of the target object is not related to the image content. The effect of the generated dynamic image is good and the user experience can be improved.

Embodiments of the present disclosure provide a computer program product having instructions. When the instructions are executed by a computer, the computer is configured to generate a method for generating a dynamic image.

In some embodiments, the method includes obtaining a video based on a trigger operation; obtaining images of the video by separating the images and audio data of the video, in which the images include first images and second images, each first image contains a target object, and each second image does not contain a target object; obtaining target images by processing the first images, in which each target image does not contain the target object; and generating the dynamic image based on the images and the target images.

In some embodiments, the method further includes determining an image as a first image based on the image containing a target region, in which an image feature of the target region matches an image feature of the target object.

In some embodiments, the image containing a target region includes detecting the image based on image areas of an object size, in which the object size is included in the image feature of the target object; and determining the image containing a target region based on an image area including content of a content type, in which the content type is included in the image feature of the target object.

In some embodiments, processing the first image includes removing image content within a target region from the first image, in which the target object is located within the target region; determining a pixel value of each pixel within the target region based on pixel values of neighboring pixels; and determining a boundary of the target region based on an image fusion manner.

In some embodiments, determining a pixel value of each pixel within the target region includes determining the pixel value of each pixel within the target region based on a weighted average of pixel values of neighboring pixels.

In some embodiments, generating the dynamic image includes generating a video from the second images and the target images based on a playback sequence of the images; and generating the dynamic image based on a specified image of the images and the video.

In some embodiments, generating the dynamic image includes generating a video from a part of the second images and the target images; and generating the dynamic image based on a specified image of the images and the video.

With the technical solution according to embodiments of the disclosure, in response to the operation for generating a dynamic image triggered by the user account, the video is obtained. The images and the audio data of the video are separated to obtain the images. The images include the first images each including the target object and the second images each not including the target object. The first images included in the images are processed to obtain the target images each not including the target object. Based on the images and the target images, the dynamic image is generated. Therefore, the dynamic image generated according to embodiments of the disclosure does not include sound or the target object that the display content of the target object is not related to the image content. The effect of the generated dynamic image is good and the user experience can be improved.

Other embodiments of the present disclosure will be apparent to those skilled in the art after considering the description and practicing the present disclosure disclosed herein. The present disclosure is intended to cover any variations, uses or adaptive changes of the present disclosure. These variations, uses or adaptive changes are in accordance with general principles of the present disclosure and include common knowledge or technical means in the art that are not disclosed herein. The description and embodiments are to be regarded as illustrative only, and the real scope and spirit of the present disclosure are pointed out in the attached claims.

It should be understood that the present disclosure is not limited to the precise structures described above and illustrated in the drawings, and various modifications and changes may be made without departing from the scope thereof. The scope of the present disclosure is merely limited by the attached claims.

What is claimed is:

1. A method for generating a dynamic image, comprising:
obtaining an initial video based on a trigger operation;
obtaining initial images of the video by separating the initial images and audio data of the initial video, wherein the initial images comprise first images and second images, each first image contains a target object, and each second image does not contain the target object, wherein the target object comprises any object with a predetermined image feature;
obtaining target images by processing the first images, wherein each target image does not contain the target object; and
generating the dynamic image based on the initial images and the target images;
wherein said processing the first image comprises:
removing image content within a target region from the first image, wherein the target object is located within the target region;
determining a pixel value of each pixel within the target region based on a weighted average of pixel values of neighboring pixels; and
determining a boundary of the target region based on an image fusion manner;
wherein said generating the dynamic image comprises:
generating a first video from the target images and a plurality of images in the second images based on a playback sequence of the initial images;
selecting an image from the second images as a static image; and
generating the dynamic image based on the static image and the first video;
wherein the dynamic image is used to display content of the static image and the first video; the static image is a frame of image selected from the plurality of images in the second images.

2. The method of claim 1, further comprising:
determining an image as a first image based on the image containing a target region, wherein an image feature of the target region matches the predetermined image feature.

3. The method of claim 2, wherein said the image containing a target region comprises:
detecting the image based on image areas of an object size, wherein the object size is included in the image feature of the target object; and
determining the image containing a target region based on an image area including content of a content type, wherein the content type is included in the image feature of the target object.

4. An electronic device, comprising:
one or more processors and one or more memories storing computer instructions that when executed by one or more processor to perform operations comprising:
obtaining an initial video based on a trigger operation;
obtaining initial images of the video by separating the initial images and audio data of the initial video, wherein the initial images comprise first images and second images, each first image contains a target object, each second image does not contain the target object, wherein the target object comprises any object with a predetermined image feature;
obtaining target images by processing the first images, wherein each target image does not contain the target object; and
generating the dynamic image based on the initial images and the target images;
wherein said processing the first image comprises:
removing image content within a target region from the first image, wherein the target object is located within the target region;
determining a pixel value of each pixel within the target region based on a weighted average of pixel values of neighboring pixels; and
determining a boundary of the target region based on an image fusion manner;
wherein said generating the dynamic image comprises:
generating a first video from the target images and a plurality of images in the second images based on a playback sequence of the initial images;
selecting an image from the second images as a static image; and
generating the dynamic image based on the static image and the first video;

wherein the dynamic image is used to display content of the static image and the first video; the static image is a frame of image selected from the plurality of images in the second images.

5. The electronic device of claim 4, wherein the operations further comprise:
   determining an image as a first image based on the image containing a target region, wherein an image feature of the target region matches the predetermined image feature.

6. The electronic device of claim 5, wherein the operations further comprise:
   detecting the image based on image areas of an object size, wherein the object size is included in the image feature of the target object; and
   determining the image containing a target region based on an image area including content of a content type, wherein the content type is included in the image feature of the target object.

7. A non-transitory computer readable storage medium, having instructions executable by a processor, wherein when the instructions are executed by the processor, a method for generating a dynamic image is implemented, the method comprising:
   obtaining an initial video based on a trigger operation;
   obtaining initial images of the video by separating the initial images and audio data of the initial video, wherein the initial images comprise first images and second images, each first image contains a target object, each second image does not contain the target object, wherein the target object comprises any object with a predetermined image feature;
   obtaining target images by processing the first images, wherein each target image does not contain the target object; and
   generating the dynamic image based on the initial images and the target images;
   wherein said processing the first image comprises:
   removing image content within a target region from the first image, wherein the target object is located within the target region;
   determining a pixel value of each pixel within the target region based on a weighted average of pixel values of neighboring pixels; and
   determining a boundary of the target region based on an image fusion manner;
   wherein said generating the dynamic image comprises:
   generating a first video from the target images and a plurality of images in the second images based on a playback sequence of the initial images;
   selecting an image from the second images as a static image; and
   generating the dynamic image based on the static image and the first video;
   wherein the dynamic image is used to display content of the static image and the first video; the static image is a frame of image selected from the plurality of images in the second images.

8. The non-transitory computer readable storage medium of claim 7, wherein the method further comprises:
   determining an image as a first image based on the image containing a target region, wherein an image feature of the target region matches the predetermined image feature.

9. The non-transitory computer readable storage medium of claim 8, wherein said determining the image containing a target region comprises:
   detecting the image based on image areas of an object size, wherein the object size is included in the image feature of the target object; and
   determining the image containing a target region based on an image area including content of a content type, wherein the content type is included in the image feature of the target object.

\* \* \* \* \*